United States Patent
Ji

(10) Patent No.: US 9,022,319 B2
(45) Date of Patent: May 5, 2015

(54) CONDENSER ICE REMOVAL FOR ENVIRONMENTAL CONTROL SYSTEM

(71) Applicant: Hamilton Sundstrand Corporation, Windsor Locks, CT (US)

(72) Inventor: Changdae Ji, Manchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 211 days.

(21) Appl. No.: 13/713,012

(22) Filed: Dec. 13, 2012

(65) Prior Publication Data

US 2014/0166812 A1 Jun. 19, 2014

(51) Int. Cl.
*B64D 13/06* (2006.01)
*F25B 29/00* (2006.01)

(52) U.S. Cl.
CPC ............... *F25B 29/00* (2013.01); *B64D 13/06* (2013.01); *B64D 2013/0666* (2013.01)

(58) Field of Classification Search
CPC ........... B64D 13/06; B64D 2013/0618; B64D 2013/0666; F25B 29/00
USPC ......... 62/81, 156, 277; 60/39.093; 244/118.5, 244/134 C
See application file for complete search history.

(56) References Cited

U.S. PATENT DOCUMENTS

| | | | |
|---|---|---|---|
| 2,809,714 A * | 10/1957 | Sims, Jr. et al. | 96/372 |
| 2,829,505 A * | 4/1958 | Oates, Jr. | 62/154 |
| 4,173,512 A | 11/1979 | Meier et al. | |
| 4,484,396 A | 11/1984 | Darm | |
| RE32,100 E * | 4/1986 | Rannenberg | 62/80 |
| 4,662,023 A | 5/1987 | Meuschke et al. | |
| 4,671,920 A | 6/1987 | Scrabis et al. | |
| 4,711,759 A | 12/1987 | Scrabis et al. | |
| 4,723,611 A | 2/1988 | Scrabis et al. | |
| 5,086,622 A * | 2/1992 | Warner | 62/88 |
| 5,214,935 A * | 6/1993 | Brunskill | 62/402 |
| 5,275,008 A | 1/1994 | Song et al. | |
| 5,461,882 A * | 10/1995 | Zywiak | 62/401 |
| 6,295,822 B1 * | 10/2001 | Mueller | 62/172 |
| 6,457,318 B1 * | 10/2002 | Lui et al. | 62/87 |
| 7,334,423 B2 * | 2/2008 | Bruno et al. | 62/402 |
| 7,419,357 B2 | 9/2008 | Nohr et al. | |
| 7,779,644 B2 | 8/2010 | Decrisantis et al. | |
| 8,015,825 B2 | 9/2011 | Elder et al. | |
| 8,066,481 B2 | 11/2011 | Bannon | |
| 2004/0194493 A1 * | 10/2004 | Army et al. | 62/402 |
| 2004/0195447 A1 * | 10/2004 | Claeys | 244/118.5 |
| 2005/0115249 A1 * | 6/2005 | Haas et al. | 62/86 |
| 2005/0166629 A1 * | 8/2005 | Axe et al. | 62/401 |

* cited by examiner

*Primary Examiner* — Tien Dinh
*Assistant Examiner* — Alexander V Giczy
(74) *Attorney, Agent, or Firm* — Carlson, Gaskey & Olds, PC

(57) ABSTRACT

Environmental control system bleed air is cooled by a heat exchanger. A fan pulls ambient air from a ram inlet duct across the at least heat exchanger and to an outlet. An air cycle machine drives the fan. The bleed air passes downstream of the at least heat exchanger to a compressor, and then drives a first stage turbine. The first stage turbine has an outlet communicating with a condenser, and then a second stage turbine. An icing control system taps hot air downstream of the compressor. An add heat valve is selectively moveable between a first position blocking flow from the tap passage. A second position where it passes air from the tap passage to the condenser inlet, and to a point downstream of the condenser and to the second stage turbine. In a third position, the valve only communicates air from the tap passage into the condenser.

7 Claims, 1 Drawing Sheet

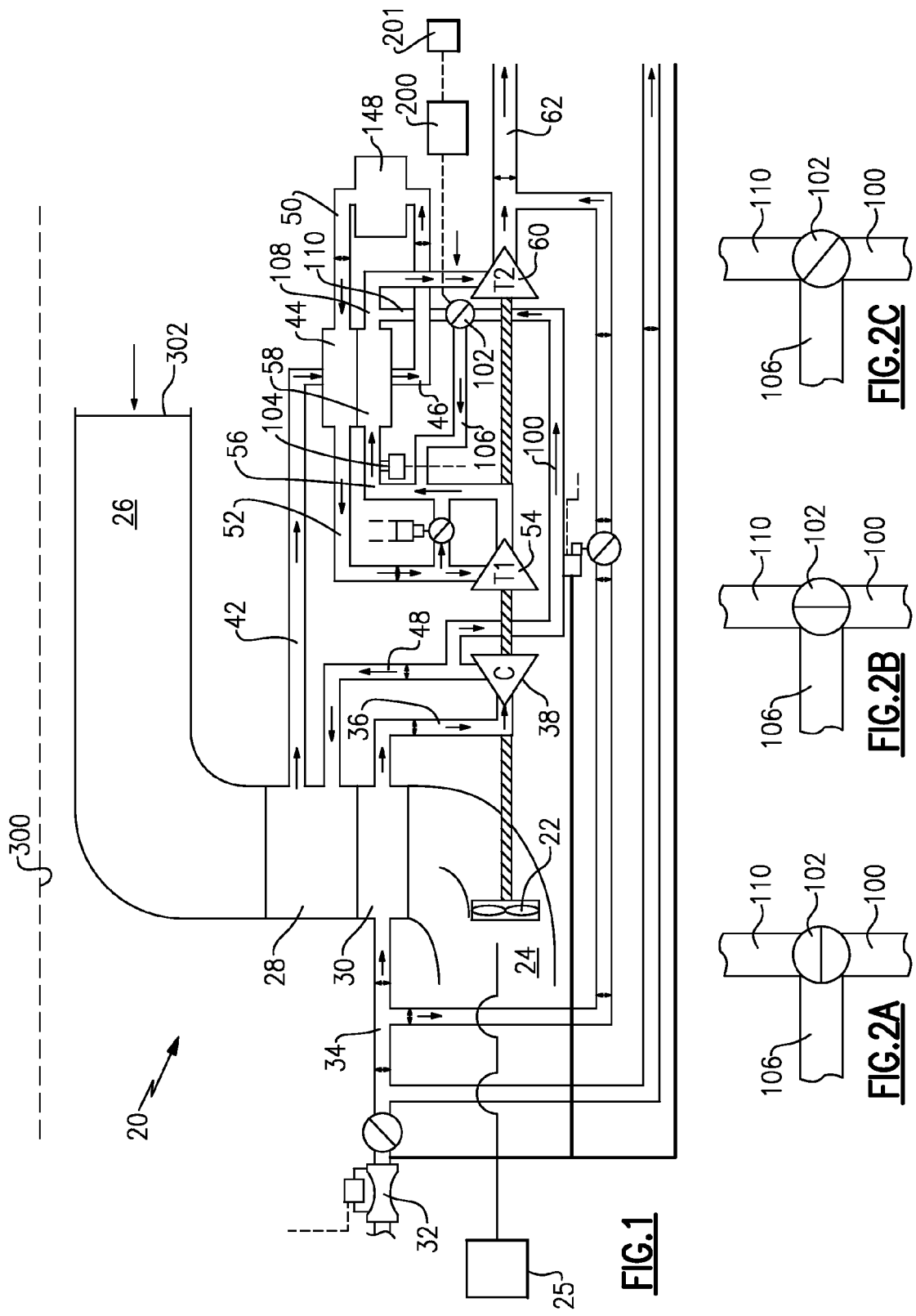

CONDENSER ICE REMOVAL FOR ENVIRONMENTAL CONTROL SYSTEM

BACKGROUND OF THE INVENTION

This application relates to a system and method for removing ice at a condenser which is a component of an environmental control system.

Air is typically supplied to an aircraft by conditioned bleed air from the engine. Because this source of air is too hot for the cabin environment, the air flows through an environmental control system that decreases the air temperature by means of exchanging heat through the heat exchangers in a ram air flow circuit. Ram air flow is outside air that passes through the heat exchangers of the environmental control system. The conditioned air then flows through a condenser to condense the moisture out of the air stream to provide a comfortable dry air source to the cabin environment.

The condenser raises challenges with regard to icing, especially on aircraft that do not have the capacity to modulate the amount of ram air flow through the heat exchangers. When the ambient air is especially cold, icing becomes a particular problem since the bleed air from the engine can be cooled to freezing temperatures. Thus, it is known to include an on/off valve that selectively adds hot air from the outlet of a compressor into the inlet of the condenser, and also into the inlet of a second stage turbine.

When the ambient temperature is below a predetermined amount, the valve is commanded to be full open, thus attempting to raise the temperature at the inlet of the condenser to prevent freezing, and to also raise the temperature of the inlet of a second stage turbine to prevent turbine rotor freezing.

However, there is a range of ambient conditions where the temperature is below freezing and aircraft operation provides too much ram air flow. In this condition, the on/off valve does not have sufficient thermal capacity to maintain the condenser inlet temperature above freezing, which can lead to undesirable consequences.

SUMMARY OF THE INVENTION

An environmental control system has an inlet duct for receiving hot air. At least one heat exchanger is in the path of the hot air between the inlet duct and an outlet. A fan pulls ram air for cooling the hot air as it passes the at least one heat exchanger. An air cycle machine drives the fan. The hot air passes downstream of the at least one heat exchanger to be compressed by a compressor, and then drives a first stage turbine. The first stage turbine has an outlet communicating with a condenser. The condenser has an outlet communicating with a second stage turbine. An icing control system includes a tap passage for tapping hot air downstream of the compressor, and passing it to an add heat valve. The add heat valve is selectively moveable between three positions. A first position blocks flow from the tap passage into a condenser line leading to an inlet to the condenser. A second position where it passes air from the tap passage into the condenser line leading to the condenser inlet, and further to a point downstream of the condenser and to the second stage turbine. In a third position, the valve only communicates air from the tap passage into the condenser.

These and other features may be best understood from the following specification and drawings, the following which is a brief description.

BRIEF DESCRIPTION OF THE DRAWINGS

FIG. 1 schematically shows an environmental control system.

FIG. 2A shows a valve in an off position.
FIG. 2B shows a valve in a full on position.
FIG. 2C shows the valve in a third position.

DETAILED DESCRIPTION

An environmental control system 20 is illustrated in FIG. 1. A bleed air source enters the environmental control system 20 by an inlet duct 32 and continues to flow to ducting 34. Since the bleed air is hot, the inlet air is cooled at a primary heat exchanger 30, and a secondary heat exchanger 28. The cooling source is the ambient air that is pulled by a fan 22 from a ram inlet duct 26 to an outlet 24. The ram inlet duct 26 communicates with an opening 302 which is on an outer surface of an aircraft 300, shown schematically. Notably, the air in the ram inlet duct 26 does not mix with the interior of the heat exchangers 28 or 30, but rather passes across them such that the bleed air 32 is cooled.

After the bleed air passes the primary heat exchanger 30 the air passes into a flow line 36, and to a compressor 38. Downstream of a compressor 38 the air passes into a line 48 leading into a secondary heat exchanger 28. Secondary heat exchanger 28 further cools the air. The air downstream of the heat exchanger 28 passes into a passage 42 and from passage 42 across a reheater 44 and condenser 58. The air from line 42 does not mix with the interior of the reheater 44 or the condenser 58, but instead passes to a passage 46 through a water collector 148 and back through a passage 50 through the reheater 44. Notably, the turbines 60 and 54 drive the compressor 38 and fan 22.

The air downstream of the reheater 44 passes into a passage 52, and across a first stage turbine 54. Downstream of the turbine 54 the air passes into a passage 56, and through the condenser 58. Downstream of the condenser 58 the air passes into a passage 108, and across a second stage turbine 60 before exiting through a passage 62.

Air downstream of the compressor 38 may also be tapped through a passage 100 to approach a valve 102. Valve 102 is an add heat valve, but is an improvement over the prior art.

The add heat valve 102 selectively blocks air from entering passages 106 or 110, can deliver air into both passages 106 and 110 and can deliver air solely into passage 106, such as in the position illustrated in FIG. 1. A temperature sensor 104 communicates with a control for the valve 102.

Thus, should no additional heating be necessary at the condenser, such as when the ambient temperature of the air is not below a predetermined minimum, the valve 102 will be in the position shown in FIG. 2A. In this position, the valve 102 blocks communication between passage 100 and both passages 106 and 110. On the other hand, if the ambient temperature drops below a first predetermined temperature then the valve may be moved to the position shown in FIG. 2B. In this position, the hot air from the passage 100 can pass into passages 106 and 110. Thus, hotter air is delivered to the condenser, and to the turbine. The air from passage 110 mixes with the air in passage 108, and passes toward the turbine 60.

A control 200 controls the valve 102 to move between the positions of FIGS. 2A-2C. In part, information from sensor 104 and a sensor 201 which may sense outside air temperature and humidity is relied upon by the control to determine a desired position.

Under certain conditions, the ambient temperature is below freezing and aircraft operation provides too much ram air flow. If such a condition is sensed, then the valve may be moved to the position shown in FIG. 2C. In this position, the valve 102 is rotated to communicate the passage 100 to the passage 106, but block communication to the passage 110.

Now, all of the heating capacity of the air in the passage 100 is delivered into the condenser inlet through the passage 106.

The present invention thus addresses the problem mentioned above with regard to icing under certain conditions.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An environmental control system comprising:
an inlet duct for receiving inlet hot at least one heat exchanger in a path of the hot air between the inlet duct and an outlet to cool the hot air, a fan to pull ram air for cooling the hot air across the at least one heat exchanger;
first and second stage turbines for driving said fan, the hot air passing downstream of the at least one heat exchanger to be compressed by a compressor, and then driving said first stage turbine, said first stage turbine having an outlet communicating with a condenser, and said condenser having an outlet communicating with said second stage turbine; and
an icing control system including a tap passage tapping hot air downstream of said compressor, the tapped hot air passing to an add heat valve, the add heat valve being selectively moveable between three positions, including a first position where the add heat valve blocks flow from said tap passage into a condenser line leading to an inlet to said condenser, a second position where the add heat valve passes air from said tap passage both into said condenser line, and further to a point downstream of said condenser and passing to said second stage turbine, and a third position wherein said add heat valve only communicates air from said tap passage into said condenser line leading to said condenser inlet.

2. The system as set forth in claim 1, wherein a temperature sensor upstream of said condenser is relied upon at least in part to determine which of said three positions is appropriate.

3. The system as set forth in claim 1, wherein there is at least a first and second of said heat exchangers, and air downstream of said compressor passing into said second of said heat exchangers, and air in said second of said heat exchangers passing through a reheater, and then across said first stage turbine.

4. An aircraft comprising:
an aircraft body, a ram air system including an outer opening on an outer surface of said aircraft body; and
an environmental control system including a source of hot air for passing through at least one heat exchanger, and ram air driven by a fan across said at least one heat exchanger, to be compressed by a compressor, and then driving a first stage turbine, said first stage turbine having an outlet communicating with a condenser, and said condenser having an outlet communicating with a second stage turbine, an icing control system including a tap passage for tapping hot air downstream of said compressor, and the tapped air passing to an add heat valve, the add heat valve being selectively moveable between three positions, including a first position where the add heat valve blocks flow from said tap passage into a condenser line leading to an inlet to said condenser, a second position where the add heat valve passes air from said tap passage both into said condenser line, and further to a point downstream of said condenser and passing to said second stage turbine, and a third position wherein said add heat valve only communicates air from said tap passage into said condenser line leading to said condenser inlet.

5. The aircraft as set forth in claim 4, wherein a temperature sensor upstream of said condenser is relied upon at least in part to determine which of said three positions is appropriate.

6. The aircraft as set forth in claim 4, wherein there is at least a first and second of said heat exchanger in the path of the hot air, and air passing to said compressor passing into said second of said heat exchangers, and said air in said second of said heat exchangers passing through a reheater, and then across said first stage turbine.

7. A method of operating an environmental control system for use on an aircraft including the steps of:
(a) delivering hot air from a source, through at least one heat exchanger, and downstream of the at least one heat exchanger to a compressor, and then to a turbine drive system;
(b) passing ambient air from outside of said aircraft into an inlet duct, across the at least one heat exchanger, and through a fan pulling the ambient air to use for hot air cooling;
(c) selectively tapping air downstream of said compressor through a tap passage to an inlet of said condenser, and also to an inlet for a second stage turbine in the turbine drive system, with a valve movable between three positions based upon conditions, and said valve being moved between a first position at which the valve blocks flow from said tap passage to both the inlet to the condenser, and to the second stage turbine, a second position where the valve allows flow of the air from the tap passage to both said condenser inlet and to said second stage turbine, and to a third position at which the valve blocks flow to the second stage turbine, but allows flow to said condenser inlet.

* * * * *